Patented Oct. 6, 1953

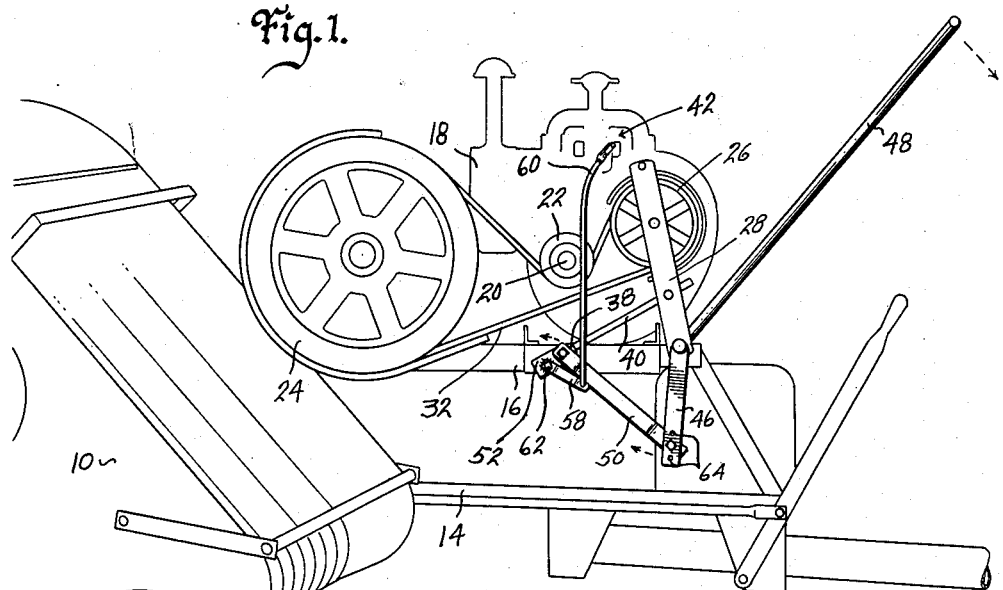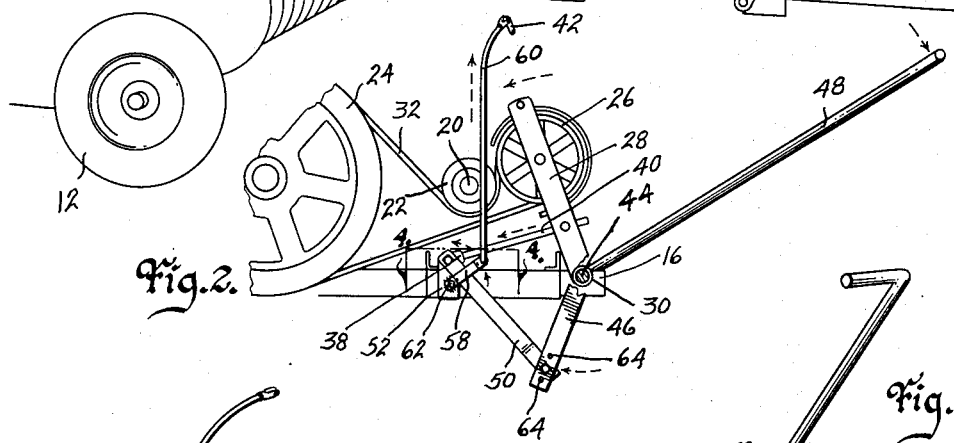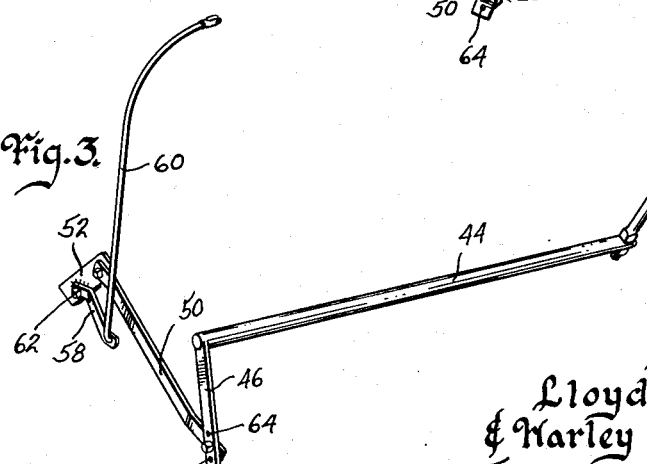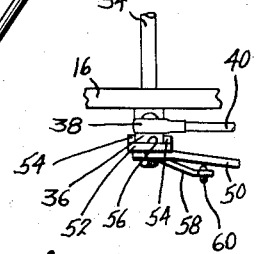

2,654,263

UNITED STATES PATENT OFFICE 2,654,263

CLUTCH AND THROTTLE CONTROL FOR BALERS

Lloyd H. Pringnitz, Goodell, and Harley W. Pringnitz, Kanawha, Iowa

Application January 2, 1953, Serial No. 329,172

5 Claims. (Cl. 74—472)

Our invention relates to a combination clutch and throttle control lever for a baler and while it has special simple adaptability for a particular baler known as the New Holland Model 77 automatic baler, it can easily be adapted to other balers having similar features as will hereafter appear.

In the operation of the New Holland Model 77 automatic baler, power to the baler is transmitted from an internal combustion engine by a V-belt drive and the clutch action consists of tightening the belt to engage the motor pulley and in loosening the belt to disengage the baler therefrom. This is accomplished by a main drive pulley wheel on the baler and a second pulley wheel spaced therefrom that is supported by a frame hingedly mounted on the motor mount. The motor pulley is intermediate the other two and an endless belt on the first two is movable into and out of engagement with the motor pulley by movement of the second pulley on its hinged support in a manner well known in the art. Movement of the hinged pulley frame is controlled by a relatively short hand operated lever disposed at one side of the motor mount. As a result of this structure, the person pulling this baler from a tractor must dismount each time the clutch lever is thrown in or out as it cannot be reached from the tractor seat and since there are frequent occasions when it is necessary to manipulate the clutch it will be apparent that this feature has disadvantages from the standpoint of consuming time and is an inconvenience to the operator.

It should also be pointed out that the engine on this baler, as on many others, has for all practical purposes, two speeds, namely, an idling speed and an operating speed. Thus, if the clutch is thrown out so that the operator can stop to talk or call to someone or for any other purpose, the motor will continue at full operating speed, which creates considerable noise, unless throttled down by separate manipulation of the throttle lever. Conversely, when the baler is again started, both the throttle and clutch require separate attention.

With these aspects of the above identified baler in mind, it is the principal object of our invention to provide for said baler a single lever means that will simultaneously engage the clutch means and set the throttle at operating speed and conversely will simultaneously disengage the clutch means and return the throttle to idling speed.

A further object of our invention is to provide a clutch and throttle control for balers as above set out that can be operated by a person seated on a tractor to which the baler is attached, and without requiring such person to dismount in operating said control.

Still another object of this invention is to provide a device of the above class that is easily adaptable to balers using a belt drive of the type hereinabove disclosed.

Other objects of our invention are to provide a clutch and throttle control means of the above class that is economical in manufacture, simple and easily attached, durable in construction and efficient for its intended purpose.

These and other objects will be apparent to those skilled in the art.

Our invention consists in the construction, arrangement, and combination of the various parts of the device, whereby the objects contemplated are attained as hereinafter more fully set forth, and specifically pointed out in our claims, and illustrated in the accompanying drawings, in which:

Fig. 1 is a perspective schematic fragmentary view of a baler known as the New Holland Model 77 showing a preferred embodiment of our invention applied thereto with the belt drive engaging the motor pulley and the throttle in operating position, Fig. 2 is an elevational view of our invention showing the belt drive out of engagement with the motor pulley, the throttle control lever in idling position, arrows to indicate the direction of movement of the respective parts, and portions broken away to more fully illustrate the construction thereof, Fig. 3 is a perspective enlarged view of our invention, and Fig. 4 shows the connection of our control means to the baler from the line 4—4 of Fig. 2.

Referring to the drawings we have illustrated schematically sufficient of the New Holland Model 77 baler to demonstrate the application of our invention thereto but it will be understood that this device is not limited to the identified baler and can be used on other balers and the like having belt drives of the same general nature. The numeral 10 designates the forward portion of the bale pick-up housing that is wheel supported 12 on one side and attached to a frame means 14 on the other. Since no portion of the baler except the drive means and throttle is concerned with this invention, a detailed description of the baler structure and its operation is unnecessary and has thus been omitted. The frame 14 carries an elevated motor mount 16 on which is disposed the gasoline motor 18 having a drive shaft 20 on which is secured the pulley wheel 22 as shown in Fig. 1. A main drive wheel 24 that is operatively connected to the baling mechanism is suitably disposed to the rear of motor pulley 22. Forwardly of the motor pulley 24 is a second pulley wheel 26 that is carried by an upwardly and rearwardly extending frame 28 which is hingedly or pivotally mounted at the bottom to a member 30 transversely arranged at the front of the motor mount 16 as shown in Fig. 2. Member 30 in the New Holland Model 77 baler consists of a tube and while this feature is utilized in adapting our invention to this particular baler it will later appear that other structures for belt drives can also be accommodated. An endless belt 32 is connected to pulleys 24 and 26 and is capable of engaging motor pulley 22 as shown in Figs. 1 and 2. Frame 28 is movable forwardly and rearwardly on its pivot end to take up and create slack in the belt whereby the operation of the main drive 24 is controlled and it is in machines having this same general feature that our invention finds utility. In the New Holland baler, the movement of frame 28 is accomplished as follows. A rotatable shaft 34 is mounted transversely of frame 16 rearwardly of member 30 and is rotated by a short hand lever (not shown) at the outer side of frame 16. Shaft 34 protrudes from the inner side of frame 16 and a bar or plate 36 that is vertically arranged when belt 32 is not engaged with the motor pulley is secured thereto at its bottom portion so as to move in an arc when the shaft is rotated. To the top of plate 36 one end of a socket member 38 is pivotally secured and a rigid rod 40 has one end secured in socket 38 and its other end secured to frame 28. It will thus be understood that as bar 36 is rotated forwardly, which would be a counterclockwise movement of the lever not shown, that rod 40 will move frame 28 on its pivot point so that the distance between pulleys 26 and 24 is increased and belt 32 engages the motor pulley. Conversely the rearward movement of bar 36 moves pulleys 26 and 24 towards each other to create slack in belt 32. As bar 36 moves forwardly, the pivotal connection between it and socket 38 passes over center so that the belt drive is locked in operating position. The motor 18 is provided with a throttle lever shown generally at 42 that has the two basic positions of idling or full operation and is separately operated relative to its belt drive. The structure hereinabove described is that provided on the baler identified and no invention is claimed therefore.

Our invention, as pointed out above, is designed to make both the belt drive and throttle simultaneously operable by a single lever that can be controlled by the tractor operator without dismounting and for this purpose our clutch and throttle control means is formed as follows. A horizontal elongated rod 44 carries a rigidly affixed depending arm 46 on one end as shown in Fig. 3. This rod is slightly longer than tube 30 and is rotatably positioned therethrough so that arm 46 depends on the inner side of frame 16. The other end of this rod protrudes from the outer side of frame 16 and carries a detachably affixed elongated rod hand lever 48 that extends forwardly and upwardly to a point within each reach of a person driving a tractor to which the baler is hitched. To the bottom of arm 46 there is pivotally attached a connecting bar 50 that extends rearwardly therefrom so that its rearward end is pivotally attached to the top portion of a bar plate or clamp means 52 that is provided on its inner side with the spaced shoulders 54 that form a channel 56 when viewed from the top as illustrated in Fig. 4. To the outside bottom portion of clamp 52 is rigidly secured a bar member 58 that extends forwardly thereof and to the free end thereof a throttle rod 60 is pivotally attached which extends to and is connected with the throttle lever 42. Clamp 52 is arranged on the outer side of bar 36 so that shoulders 54 embrace the sides thereof (Fig. 4) and is suitably secured thereto by any suitable means such as the bolt 62.

Thus constructed and arranged it will be seen that when the lever handle 48 is in its downward position the arm 46 is rotated toward the rear so that the connecting bar 50 has rotated clamp 52 to the vertical whereby rod 40 has drawn frame 28 and pulley wheel 26 rearwardly which disengages the belt drive. With clamp 52 in vertical position, bar 58 extends forwardly and upwardly therefrom and in this position throttle rod 60 will have moved throttle 42 to idling position. Therefore, when lever 48 is moved upwardly only a short distance, arm 46, the linkage connecting bar 50, plate 52, bar 36 and rod 40 all move forwardly to move frame 16 and pulley 26 in the same direction and place the belt drive in engagement with the motor pulley. As this occurs, rod 58 moves downwardly so that throttle rod 60 places the throttle in full operating position. For adjusting the linkage action between arm 46 and connecting bar 50 we have provided a plurality of spaced openings 64 on bar 46 and in vertical alignment thereon so the effective length of arm 46 can be shortened or lengthened depending upon which opening 64 the rod 50 is attached to.

In applying this device to the New Holland Model 77 baler it will be appreciated that attaching clamp 52 to bar 36, passing rod 44 through tube 30 and affixing handle 48 to the outer end of rod 44 is all that is required and can be done with a minimum of time and effort and without changing any parts now on the baler. In this respect, for example, clamp 52 was provided with the shoulders 54 so that bar 36 could be embraced rather than removed. However, it will be understood that shoulders 54 and bar 36 can be eliminated and the same action retained by pivotally joining socket 38 to the top of clamp 52. This is pointed out to illustrate how easily our invention can be adapted to machines that have a movable frame similar to frame 16, for tightening and loosening the belt drive. It is also suggested that rod 40 or the like on any similar structure can be pivotally connected directly to the top of clamp or plate 52. We pointed out above that the baler illustrated uses a tube for member 30 and this we have utilized as the support or housing for our rod 44. However, a tube for member 30 is not essential to our invention for if a bar or rod should be present in some like structure it is only necessary to mount a pair of spaced bearing members or the like on frame 16 in which rod 44 can be rotatably mounted. Thus it will be appreciated that our control device can be used particularly on the New Holland Model 77 baler with no changes in said baler and can easily be adapted to other balers with a minimum of effort.

It is submitted that the invention shown and described is aptly suited to achieve the purposes intended and is characterized by a combination of highly useful and mutually cooperating elements that combine their respective and proportionate functions in accomplishing the objects sought to be obtained.

Some changes may be made in the construction and arrangement of our clutch and throttle control for a baler without departing from the real spirit and purpose of our invention, and it is our intention to cover by our claims, any modified forms of structure or use of mechanical equivalents which may be reasonably included within their scope.

We claim:

1. In combination with the drive mechanism on a baler or the like of the class having a motor disposed on a suitable mount, a throttle on said motor, said throttle having an open and an idling position, a belt drive connection between said motor and baler machinery to be operated, a frame member pivotally arranged on the motor mount which carries a pulley wheel that is a part of said belt drive, a plate pivotally secured to said motor mount, a rod pivotally secured at one end to said plate and similarly secured at its other end to said frame whereby rotation of said plate in different directions at times moves said frame correspondingly to tighten and loosen respectively said belt drive for placing said belt drive into and out of engagement with said motor, a single control means for said belt drive and throttle, comprising, a rod member rotatably disposed on said motor mount, a lever handle detachably secured to one end of said rod member, said lever handle extending forwardly and upwardly from said baler to a point that will be within arms' reach of a person seated on a tractor to which the baler will be hitched, an arm member rigidly secured to the other end of said rod member and depending therefrom, a connecting bar pivotally secured at its respective ends to said plate member and the free end of said arm, a bar member rigidly secured to and extending from said plate member, a throttle rod pivotally secured at one end to said bar member and connected at its other end to said throttle, the movement of said lever handle in one direction causing said belt drive to tighten to put it in operation with the motor and simultaneously moving the throttle to open position, and the moving of said lever handle in the opposite direction creating slack in the belt drive to disengage it from the motor and simultaneously moving the throttle to idling position.

2. In combination with the drive mechanism on a baler or the like of the class having a motor disposed on a suitable mount, a throttle on said motor, said throttle having an open and an idling position, a belt drive connection between said motor and baler machinery to be operated, a frame member pivotally arranged on the motor mount which carries a pulley wheel that is a part of said belt drive, a plate pivotally secured to said motor mount, a rod pivotally secured at one end to said plate and similarly secured at its other end to said frame whereby rotation of said plate in different directions at times moves said frame correspondingly to tighten and loosen respectively said belt drive for placing said belt drive into and out of engagement with said motor, a single control means for said belt drive and throttle, comprising, a rod member rotatably disposed on said motor mount, a lever handle detachably secured to one end of said rod member, said lever handle extending forwardly and upwardly from said baler to a point that will be within arms' reach of a person seated on a tractor to which the baler will be hitched, an arm member rigidly secured to the other end of said rod member and depending therefrom, a clamp member detachably mountable on said plate, a connecting bar pivotally secured at its respective ends to said clamp member and the free end of said arm, a bar member rigidly secured to and extending from said clamp member, a throttle rod pivotally secured at one end to said bar member and connected at its other end to said throttle, the movement of said lever handle in one direction causing said belt drive to tighten to put it in operation with the motor and simultaneously moving the throttle to open position, and the moving of said lever handle in the opposite direction creating slack in the belt drive to disengage it from the motor and simultaneously moving the throttle to idling position.

3. In combination with the drive mechanism on a baler or the like of the class having a motor disposed on a suitable mount, a throttle on said motor, said throttle having an open and an idling position, a belt drive connection between said motor and baler machinery to be operated, a frame member pivotally arranged on the motor mount which carries a pulley wheel that is a part of said belt drive so that movement of said frame in different directions at times tightens and loosens respectively said belt drive for placing said belt drive into and out of engagement with said motor, a single control means for said belt drive and throttle, comprising, a rod member rotatably disposed on said motor mount, a lever handle detachably secured to one end of said rod member, said lever handle extending forwardly and upwardly from said baler to a point that will be within arms' reach of a person seated on a tractor to which the baler will be hitched, means connecting said rod member to said frame and a second means connected to said first means and said throttle whereby rotation of said rod member in one direction by movement of said handle tightens the belt drive to put it in engagement with the motor and simultaneously moves the throttle to open position, and rotation of the rod member in the opposite direction by a reverse movement of the lever handle loosens the belt drive to disengage it from the motor and simultaneously moves the throttle to idling position.

4. A device as defined in claim 1 wherein the directions of movement of the lever handle are upwardly and downwardly.

5. In combination with the drive mechanism on a baler or the like of the class having a motor disposed on a suitable mount, a throttle on said motor, said throttle having an open and an idling position, a belt drive connection between said motor and baler machinery to be operated, a frame member pivotally arranged on the motor mount which carries a pulley wheel that is a part of said belt drive, a plate pivotally secured to said motor mount, a rod pivotally secured at one end to said plate and similarly secured at its other end to said frame whereby rotation of said plate in different directions at times moves said frame correspondingly to tighten and loosen respectively said belt drive for placing said belt drive into and out of engagement with said motor, a single control means for said belt drive and throttle, comprising a rod member rotatably disposed on said motor mount forwardly of said plate, a lever handle detachably secured to one end of said rod member, said lever handle extending forwardly and upwardly from said baler to a point that will be within arms' reach of a person seated on a tractor to which the baler will be hitched, an arm member rigidly secured to the other end of said rod member and depending therefrom, a connecting bar pivotally secured at its respective ends to said plate member and the free end of said arm, a bar member rigidly secured to and extending from said plate member, a throttle rod pivotally secured at one end to said bar member and connected at its other end to said throttle, the movement of said lever handle in an upwardly direction causing said belt drive to tighten to put it in operation with the motor and simultaneously moving the throttle rod downwardly to move the throttle to open position, and the moving of said lever handle in a downwardly direction creating slack in the belt drive to disengage it from the motor and simultaneously moving the throttle rod upwardly to move the throttle to idling position.

LLOYD H. PRINGNITZ.
HARLEY W. PRINGNITZ.

No references cited.